(12) United States Patent
Niitsuma

(10) Patent No.: US 11,751,549 B2
(45) Date of Patent: Sep. 12, 2023

(54) SPINNING REEL

(71) Applicant: Shimano Inc., Osaka (JP)

(72) Inventor: Akira Niitsuma, Osaka (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 17/873,616

(22) Filed: Jul. 26, 2022

(65) Prior Publication Data

US 2023/0097331 A1 Mar. 30, 2023

(30) Foreign Application Priority Data

Sep. 28, 2021 (JP) ................................ 2021-158234

(51) Int. Cl.
*A01K 89/01* (2006.01)

(52) U.S. Cl.
CPC ....... *A01K 89/0111* (2013.01); *A01K 89/0114* (2013.01)

(58) Field of Classification Search
CPC ............ A01K 89/0111; A01K 89/0114; A01K 89/01141
See application file for complete search history.

(56) References Cited

U.S. PATENT DOCUMENTS

| | | | | | |
|---|---|---|---|---|---|
| 3,437,282 | A | * | 4/1969 | Larime | H01C 10/36 242/316 |
| 4,114,825 | A | * | 9/1978 | Murvall | A01K 89/0114 242/242 |
| 5,143,318 | A | * | 9/1992 | Tipton | A01K 89/0114 242/241 |
| 2018/0368376 | A1 | * | 12/2018 | Nishikawa | A01K 89/01141 |

FOREIGN PATENT DOCUMENTS

| | | |
|---|---|---|
| JP | 11-86 A | 1/1999 |
| JP | 2019-106898 A | 7/2019 |

* cited by examiner

*Primary Examiner* — Emmanuel M Marcelo
(74) *Attorney, Agent, or Firm* — Global IP Counselors, LLP

(57) ABSTRACT

A spinning reel includes a reel body, a spool shaft moveably supported to the reel body in a front-rear direction with a reciprocal stroke distance (S), and a spool including a bobbin trunk, the bobbin trunk including an outer circumference around which a fishing line is capable of being wound, and a front flange extending radially outward from a front end of the bobbin trunk, and connected to the spool shaft. An outer diameter of the front flange is less than 60 mm, and a first value obtained by dividing a stroke distance of the spool shaft by a winding pitch of the fishing line is greater than or equal to 20.

5 Claims, 7 Drawing Sheets

| | STROKE (S) | FRONT FLANGE OUTER DIAMETER (R) | WINDING PITCH (P) | S/P | R*S/P | SIZE CATEGORY | COMPREHENSIVE RATING FOR CASTING AND REELING |
|---|---|---|---|---|---|---|---|
| ADOPTED MODEL 1 | 17.0 | 47 | 0.5897 | 28.8 | 1355 | A | A1 |
| ADOPTED MODEL 2 | 13.5 | 43 | 0.5854 | 23.1 | 992 | B | B1 |
| COMPARATIVE MODEL 3 | 17.0 | 52 | 0.9000 | 18.9 | 982 | C | C1 |
| CONVENTIONAL MODEL 1 | 14.5 | 45 | 1.14 | 12.7 | 572 | A | A2 |
| CONVENTIONAL MODEL 2 | 13.5 | 40 | 2 | 6.8 | 270 | B | B2 |
| CONVENTIONAL MODEL 3 | 19 | 52 | 2.8 | 6.8 | 353 | C | C2 |
| CONVENTIONAL MODEL 4 | 15 | 45 | 2.5 | 6.0 | 270 | A | A3 |
| CONVENTIONAL MODEL 5 | 13 | 40 | 2.5 | 5.2 | 208 | B | B3 |
| CONVENTIONAL MODEL 6 | 17.5 | 51 | 2.5 | 7.0 | 357 | C | C3 |

FIG. 7

SPINNING REEL

CROSS-REFERENCE TO RELATED APPLICATIONS

This application claims priority to Japanese Patent Application No. 2021-158234, filed on Sep. 28, 2021. The entire disclosures of Japanese Patent Application No. 2021-158234 are hereby incorporated by reference.

BACKGROUND

Field of the Invention

The present disclosure relates to a spinning reel.

Background Art

It is known that various problems occur at the dead points of a spinning reel when the spool moves back and forth in reciprocating fashion, that is, at the frontmost and rearmost positions of the spool. For example, when the fishing line is released or cast, noise is generated and the release resistance of the fishing line increases at the dead points due to contact between the fishing lines. This causes decreased flight distance. To solve these problems at the dead points, a conventional device has been proposed with an increased spool diameter and a spool with an extended reciprocating stroke distance (for example, refer to Japanese Laid-Open Patent Application No. 2019-106898) and a device has been proposed with technology to make the winding pitch of the fishing line finer (for example, refer to Japanese Laid-Open Patent Application No. Hei 11[1999]-000086).

SUMMARY

It has been determined that in the conventional devices, if the spool diameter is increased, the diameter of the rotor for winding the fishing line around the spool is larger. Therefore, in order to provide a space to enable the rotor to rotate, the distance from the fishing rod attachment foot to the housing must be increased. That is, the larger diameter of the spool causes an increased size of the spinning reel.

Moreover, if the stroke distance of the reciprocating movement of the spool is extended, the length of a reciprocating mechanism in the front-rear direction must be increased. It is therefore necessary to increase the size of the housing to accommodate the reciprocating mechanism. That is, due to the increased stroke distance of the reciprocating movement of the spool, the spinning reel must be larger.

On the other hand, compared to the above-mentioned technology, it has been found that making the winding pitch of the fishing line finer effectively reduces the size of the spinning reel. However, it has been determined that making the winding pitch finer also creates a more complicated structure of the spinning reel, such as a reduction mechanism with a high reduction ratio, and difficult-to-manufacture components, such as a worm shaft with a thin wall thickness between grooves. As can be understood, more complicated spinning reel structures can be associated with high manufacturing costs.

Further, since the thickness of the fishing line that is used varies with the size of the spool, it is also difficult to set a suitable fishing line winding pitch in accordance with the thickness of the fishing line.

Thus, it has been determined that the prior art for solving the problem at the dead points are associated with the various problems described above.

Therefore, the present disclosure proposes a basic structure that is useful in the design of a reciprocating mechanisms and spools. That is, in the present disclosure, reference values to be used in the design of the reciprocating mechanism and the spool are set, and these reference values are used to design the reciprocating mechanism and the spool.

An object of the present disclosure is to propose a spinning reel having a basic structure that can suitably solve the problems of conventional spinning reels.

A spinning reel according to one aspect of the present invention comprises a reel body, a spool shaft, and a spool. The spool shaft is moveably supported to the reel body in the front-rear direction with a reciprocal stroke distance. The spool is connected to the spool shaft. The spool has a bobbin trunk which is capable to be wounded a fishing line. The spool also has a front flange that extends radially outward from the front end of the bobbin trunk. Here, the outer diameter of the front flange is less than 60 mm. The first value obtained by dividing the stroke distance of the spool shaft by the winding pitch of the fishing line is greater than or equal to 20.

In the spinning reel, the front flange has an outer diameter of less than 60 mm. The first value obtained by dividing the stroke distance of the spool shaft by the winding pitch of the fishing line is greater than or equal to 20. By this configuration, in a spinning reel in which the front flange has an outer diameter of less than 60 mm, the amount of fishing line that can be wound on the spool in the front-rear direction can be suitably increased. By designing a reciprocating mechanism and a spool using this configuration, the problems of the conventional spinning reels can be solved.

In the spinning reel according to another aspect of the present invention, the first value obtained by dividing the stroke distance of the spool shaft by the winding pitch of the fishing line is preferably less than or equal to 30. The problems of the conventional spinning reels can be suitably solved by designing a reciprocating mechanism and a spool using this configuration.

In the spinning reel according to another aspect of the present invention, the second value obtained by multiplying the first value by the outer diameter of the front flange is preferably 950 or more and 1500 or less. By this configuration, in a spinning reel in which the front flange has an outer diameter of less than 60 mm, by designing the reciprocating mechanism and the spool in accordance with the outer diameter of the front flange, the problems of the conventional spinning reels can be suitably solved.

In the spinning reel according to another aspect of the present invention, the winding pitch is preferably less than or equal to 1.0 mm. By designing a reciprocating mechanism and a spool using this configuration, the problems of the conventional spinning reels can be suitably solved.

The spinning reel according to another aspect of the present invention preferably further comprises a handle, a pinion gear, a first intermediate gear, a second intermediate gear, and a reciprocating mechanism. The handle is supported by the reel body so as to be rotatable. The pinion gear is supported by the reel body so as to be rotatable. The rotation of the handle is transmitted to the pinion gear.

The first intermediate gear is rotatable about a first axis parallel to the spool axis. The first intermediate gear has a first large-diameter gear that meshes with the pinion gear and a first small-diameter gear which has a smaller diameter than the first large-diameter gear and which rotates integrally with the first large-diameter gear.

The second intermediate gear is rotatable about a second axis parallel to the first axis. The second intermediate gear has a second large-diameter gear that meshes with the first small-diameter gear and a second small-diameter gear which has a smaller diameter than the second large-diameter gear and which rotates integrally with the second large-diameter gear.

The reciprocating mechanism moves the spool shaft back and forth in reciprocating fashion. The reciprocating mechanism has a driven gear that meshes with the second small-diameter gear and a worm shaft that rotates integrally with the driven gear.

By this configuration, since the fishing line can be wound about the spool as the speed of the back-and-forth movement of the spool shaft is reduced, the problems of the conventional spinning reels can be suitably solved with a relatively simple structure.

The spinning reel of the present disclosure can suitably solve the problems of the conventional spinning reels.

BRIEF DESCRIPTION OF THE DRAWINGS

FIG. 7 is a table showing each of the numerical values of the basic structure as well as comprehensive ratings of casting and reeling for conventional spinning reels and the spinning reel of the present invention.

DETAILED DESCRIPTION OF EMBODIMENTS

Figure 1:
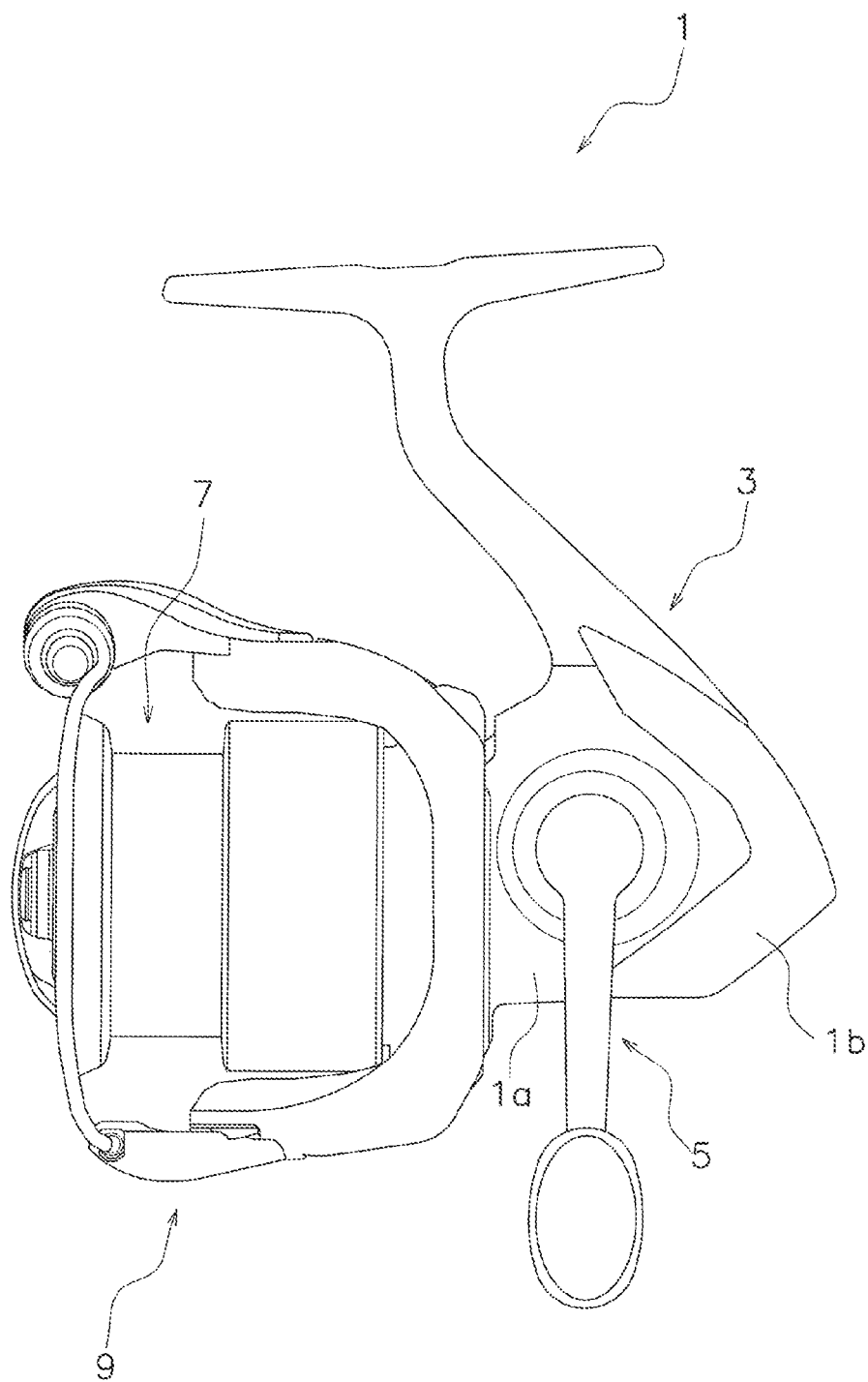
FIG. 1 is a side view of the spinning reel according to an embodiment of the present invention.
Figure 2:
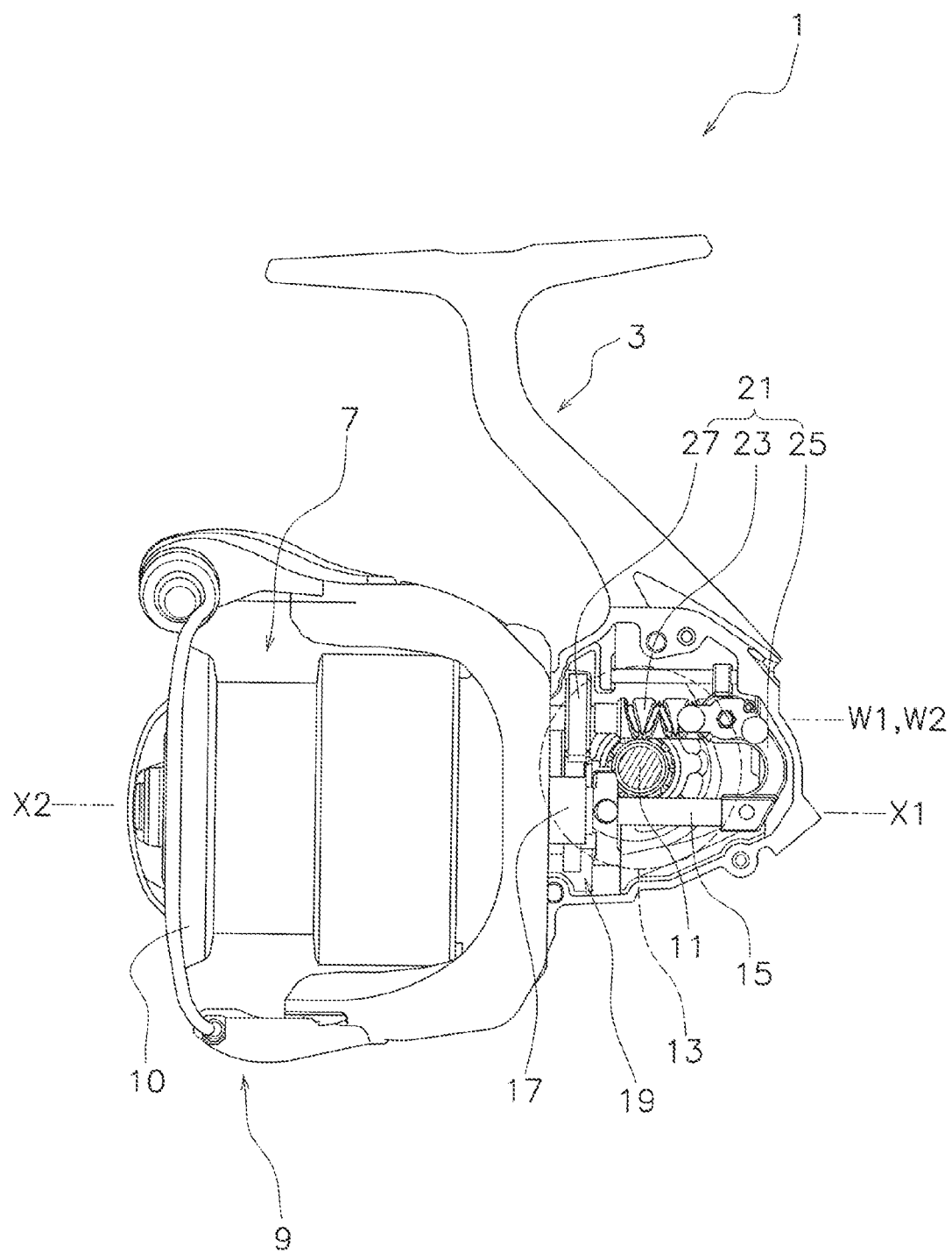
FIG. 2 is a side view of the spinning reel from which the side cover and the body guard have been removed.

As shown in FIG. 1, a spinning reel 1, to which one embodiment of the present invention is applied, comprises a reel body 3, a handle 5, a spool 7, and a rotor 9. As shown in FIG. 2, the spinning reel 1 further comprises a handle shaft 11, a drive gear 13, a spool shaft 15, a pinion gear 17, a reduction mechanism 19, and an oscillating mechanism 21 (one example of a reciprocating mechanism). FIG. 2 is a diagram in which a side cover 1a and a body guard 1b of the spinning reel 1 shown in FIG. 1 have been removed.

As shown in FIG. 1, the handle 5 is supported by the reel body 3 so as to be rotatable. In the present embodiment, an example of an embodiment in which the handle 5 is disposed on the left side of the reel body 3 is shown. The handle 5 can also be disposed on the right side of the reel body 3. The handle 5 is mounted on the handle shaft 11.

As shown in FIG. 2, the handle shaft 11 is supported by the reel body 3 so as to be rotatable. The drive gear 13 is mounted on the handle shaft 11 so as to rotate integrally with the handle shaft 11. The drive gear 13 meshes with the pinion gear 17.

A fishing line can be wound about the spool 7. As shown in FIG. 2, the spool 7 is configured to be movable in the front-rear direction with respect to the reel body 3 together with the spool shaft 15. The spool 7 is connected to the spool shaft 15. For example, the spool 7 is connected to the distal end portion of the spool shaft 15 via a drag mechanism, not shown.

The spool 7 has a central axis X2. When the spool 7 is connected to the spool shaft 15, the central axis X2 of the spool 7 is coaxial with a spool axis X1, described further below.

Figure 3:
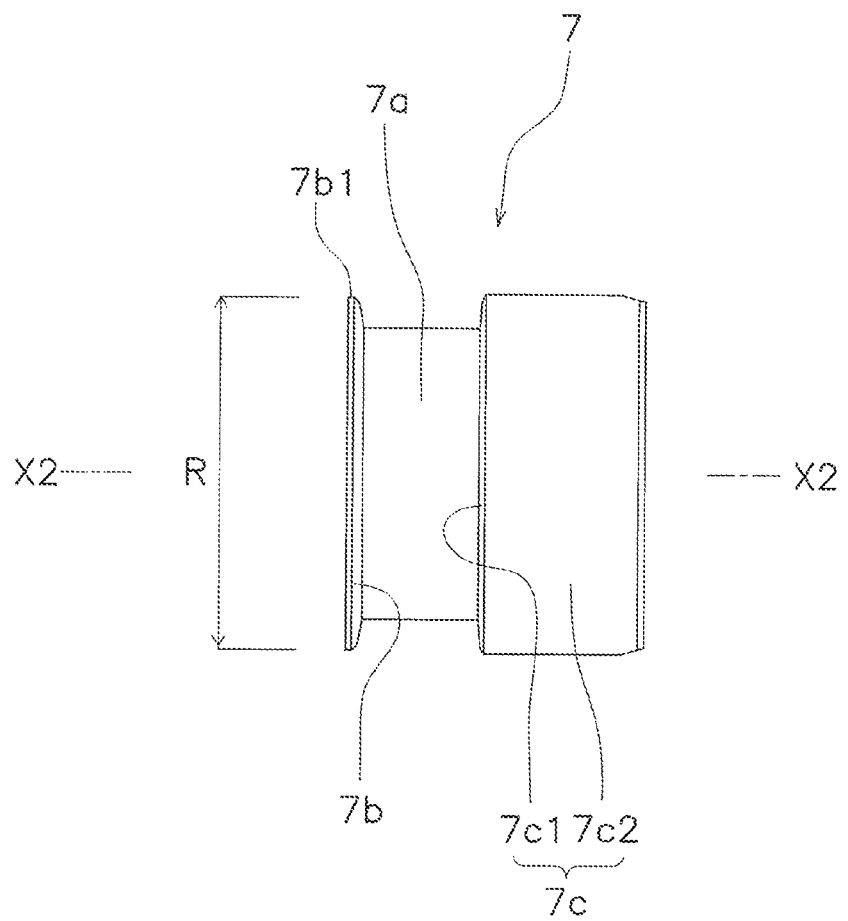
FIG. 3 is a side view of the spool.

As shown in FIG. 3, the spool 7 has a bobbin trunk 7a, a front flange 7b, and a skirt portion 7c. A fishing line can be wound about the outer periphery of the bobbin trunk 7a. The bobbin trunk 7a is formed in a cylindrical shape. The front flange 7b extends radially outward from the front end of the bobbin trunk 7a. The front flange 7b is disk-shaped with an outer diameter R and is integrally formed with the bobbin trunk 7a. The outer diameter R of the front flange 7b is defined by the outer circumferential surface 7b1 of the front flange 7b. A spool collar 10 is disposed on the radially outward side of the front flange 7b (refer to FIG. 2). The spool collar 10 covers the outer circumferential surface 7b1 of the front flange 7b.

The skirt portion 7c is integrally formed at the rear end of the bobbin trunk 7a. The skirt portion 7c includes a rear flange 7c1 and a cylindrical portion 7c2. The rear flange 7c1 extends radially outward from the rear end of the bobbin trunk 7a. The rear flange 7c1 is disk-shaped and is integrally formed with the bobbin trunk 7a. The cylindrical portion 7c2 extends rearward from the outer circumferential portion of the rear flange 7c1. The cylindrical portion 7c2 is formed in a cylindrical shape and is formed integrally with the rear flange 7c1.

As shown in FIG. 2, the spool shaft 15 is supported so as to be movable in reciprocating fashion in the front-rear direction with respect to the reel body 3. The spool shaft 15 is inserted through the inner circumferential portion of the cylindrical pinion gear 17. The spool shaft 15 can be moved back and forth in reciprocating fashion with respect to the reel body 3 via the operation of the oscillating mechanism 21.

The spool shaft 15 has a spool axis X1. The front-rear direction and the axial direction are directions of extension of the spool axis X1. The radial direction is the direction away from the spool axis X1, and the circumferential direction and the rotational direction are directions around the spool axis X1.

The oscillating mechanism 21 moves the spool shaft 15 in the front-rear direction. The oscillating mechanism 21, for example, the oscillating mechanism 21 moves the spool shaft 15 in the front-rear direction in conjunction with the rotation of the handle shaft 11. The oscillating mechanism 21 is disposed in an internal space of the reel body 3.

Figure 4:
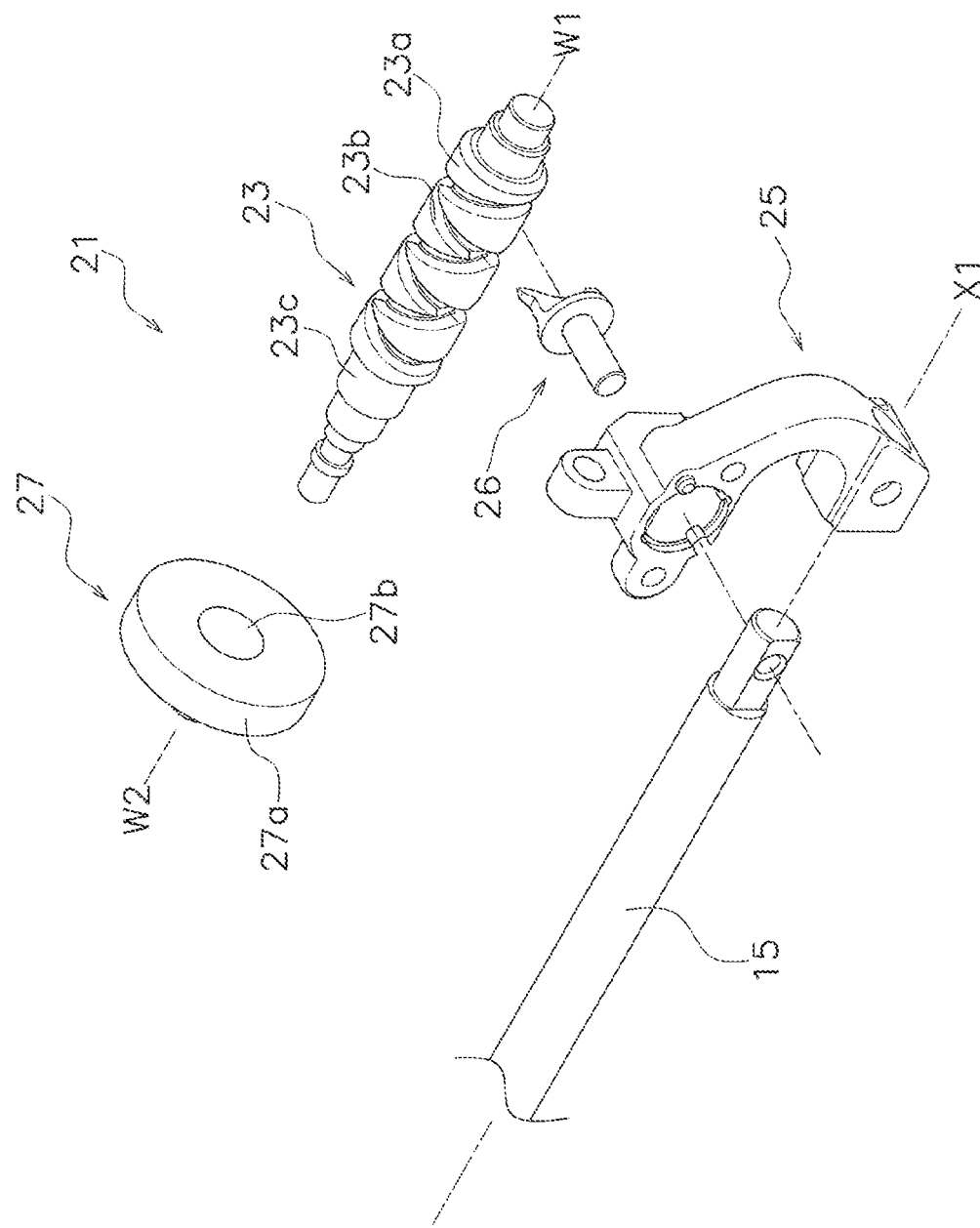
FIG. 4 is an exploded perspective view for explaining the oscillating mechanism.

As shown in FIGS. 2 and 4, the oscillating mechanism 21 includes a worm shaft 23, a slider 25, and a worm shaft gear 27 (one example of a driven gear). The worm shaft 23 rotates in order to move the spool shaft 15 and the slider 25 in the front-rear direction. The worm shaft 23 is disposed parallel to the spool shaft 15. The worm shaft 23 is supported by the reel body 3 so as to be rotatable, and has an axis of rotation W1.

The worm shaft 23 has a shaft body 23a and a groove portion 23b. The shaft body 23a is a shaft member that is longer in one direction. The shaft body 23a extends in the axial direction in which the axis of rotation W1 extends. The groove portion 23b is disposed on the outer circumferential surface of the shaft body 23a. A pawl member 26, described further below, engages the groove portion 23b.

The slider 25 is mounted on the spool shaft 15. For example, the slider 25 is fixed to the rear end of the spool shaft 15. The slider 25 moves in the front-rear direction via the rotation of the worm shaft 23.

For example, as shown in FIG. 4, the pawl member 26 is mounted on the slider 25. The pawl member 26 is mounted on the spool shaft 15 and the slider 25 so as to be rotatable. The pawl member 26 engages the groove portion 23b of the worm shaft 23. As a result, when the worm shaft 23 rotates, the pawl member 26 moves along the groove portion 23b of the worm shaft 23. The slider 25 thus moves in the front-rear direction.

As shown in FIGS. 2 and 4, the worm shaft gear 27 is disposed on the worm shaft 23, and has an axis of rotation W2. The worm shaft gear 27 is disposed on the worm shaft 23 such that the axis of rotation W2 of the worm shaft gear 27 is concentric with the axis of rotation W1 of the worm shaft 23. The worm shaft gear 27 rotates integrally with the worm shaft 23.

As shown in FIG. 4, the worm shaft gear 27 has a gear body 27a and an insertion hole 27b. The gear body 27a is disk-shaped. The gear body 27a meshes with a second small-diameter gear 33b (described further below) of the reduction mechanism 19.

The insertion hole 27b is disposed on the gear body 27a. For example, the insertion hole 27b passes through the gear body 27a in the axial direction in which the axis of rotation W2 of the worm shaft gear 27 extends. The worm shaft 23 is inserted through the insertion hole 27b. In this state, the worm shaft 23 integrally rotates with the worm shaft gear 27.

As shown in FIG. 2, the pinion gear 17 is formed in a cylindrical shape, and is supported by the reel body 3 so as to be rotatable. The pinion gear 17 is disposed on the radially outward side of the spool shaft 15. The pinion gear 17 rotates with respect to the spool shaft 15 and about the spool axis X1.

Figure 5:
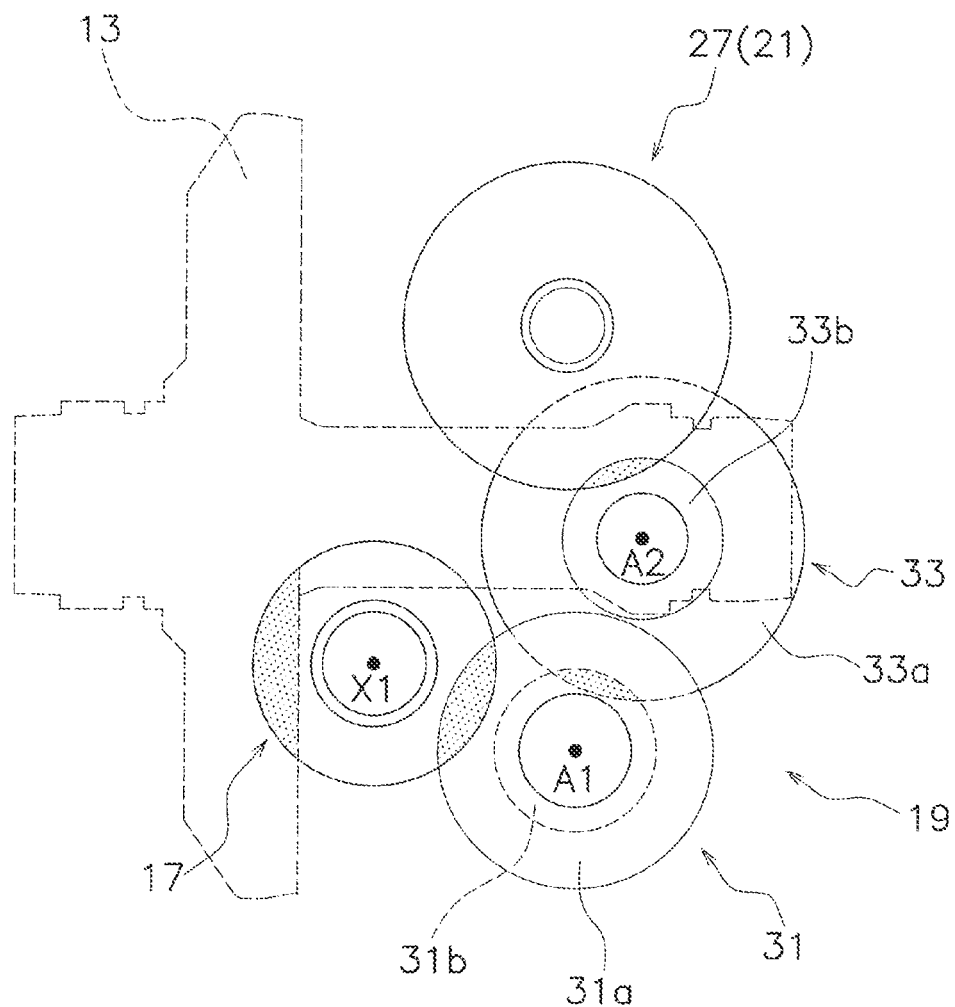
FIG. 5 is a side view for explaining the reduction mechanism.

As shown in FIG. 5, the reduction mechanism 19 reduces the rotation of the pinion gear 17 and transmits it to the oscillating mechanism 21. In FIG. 5, the gear teeth of each gear have been omitted. Hatching has been applied to the portions where the gears mesh with each other.

The reduction mechanism 19 is disposed between the pinion gear 17 and the oscillating mechanism 21. For example, the reduction mechanism 19 is disposed between the pinion gear 17 and the worm shaft gear 27.

The reduction mechanism 19 has a first intermediate gear 31 and a second intermediate gear 33. The first intermediate gear 31 is rotatable about a first axis A1 parallel to the spool axis X1. The first intermediate gear 31 is supported by the reel body 3 so as to be rotatable. The first intermediate gear 31 has a first large-diameter gear 31a and a first small-diameter gear 31b.

The first large-diameter gear 31a meshes with the pinion gear 17. The axis of rotation of the first large-diameter gear 31a is the first axis A1. The first small-diameter gear 31b has a smaller diameter than the first large-diameter gear 31a. The first small-diameter gear 31b is integrally formed with the first large-diameter gear 31a and integrally rotates with the first large-diameter gear 31a. The axis of rotation of the first small-diameter gear 31b is the first axis A1.

The second intermediate gear 33 is rotatable about a second axis A2 parallel to the first axis A1. The second intermediate gear 33 is supported by the reel body 3 so as to be rotatable. The second intermediate gear 33 has a second large-diameter gear 33a and a second small-diameter gear 33b.

The second large-diameter gear 33a meshes with the first small-diameter gear 31b. The axis of rotation of the second large-diameter gear 33a is second axis A2. The second small-diameter gear 33b has a smaller diameter than the second large-diameter gear 33a. The second small-diameter gear 33b is integrally formed with the second large-diameter gear 33a and integrally rotates with the second large-diameter gear 33a. The axis of rotation of the second small-diameter gear 33b is second axis A2. The second small-diameter gear 33b meshes with the worm shaft gear 27.

When the handle shaft 11 is rotated by the rotary operation of the handle 5, the drive gear 13 is rotated. The rotation of the drive gear 13 is transmitted to the pinion gear 17 and the rotation of the pinion gear 17 is transmitted to the worm shaft gear 27 via the reduction mechanism 19 described above. The rotation of the worm shaft gear 27 is transmitted to the worm shaft 23, and the rotation of the worm shaft 23 moves the slider 25 and the spool shaft 15 in the front-rear direction.

As shown in FIGS. 1 and 2, the rotor 9 is used to wind a fishing line about the spool 7. The rotor 9 is disposed on a front portion of the reel body 3, and is configured to be rotatable with respect to the reel body 3. The rotor 9 is disposed on the radially outward side of the pinion gear 17, and is mounted so as to be integrally rotatable with respect to the pinion gear 17.

When the handle shaft 11 is rotated by the rotary operation of the handle 5, the drive gear 13 rotates. The rotation of the drive gear 13 is transmitted to the pinion gear 17. The rotor 9 rotates in conjunction with the rotation of the pinion gear 17.

Figure 6:
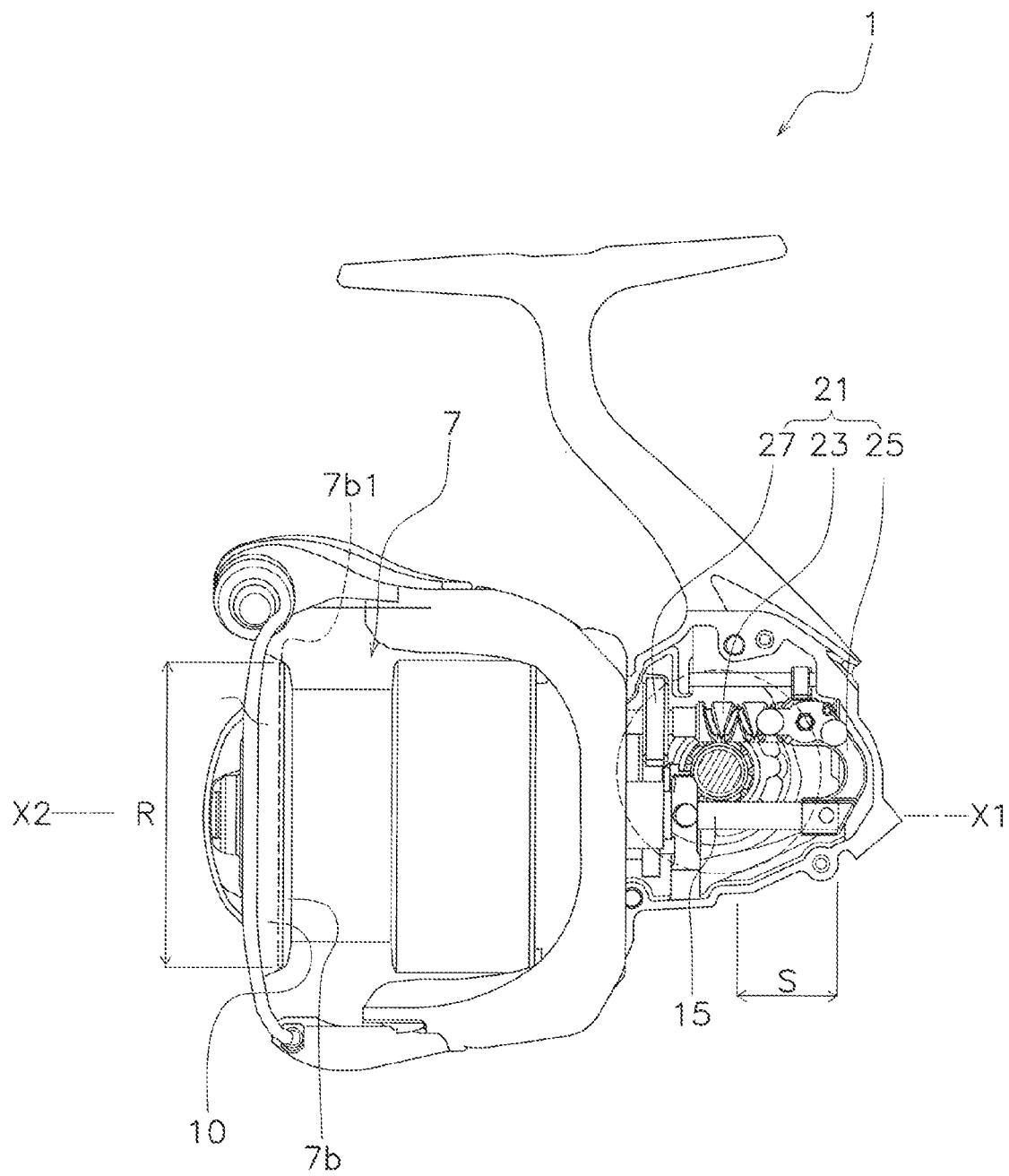
FIG. 6 is a side view for explaining a configuration used for increasing the winding amount of the fishing line.

The spinning reel 1, which has the configuration described above, is configured as follows. The outer diameter R of the front flange 7b shown in FIGS. 3 and 6 is less than 60 mm. For example, the outer diameter R of the front flange 7b is preferably greater than or equal to 35 mm and less than 60 mm.

Winding pitch P of the fishing line is less than or equal to 1.0 mm. For example, preferably, the winding pitch P of the fishing line is greater than or equal to 0.4 mm and less than or equal to 1.0 mm. More preferably, the winding pitch P of the fishing line can be greater than or equal to 0.55 mm and less than or equal to 0.90 mm. The pitch P of the fishing line winding is the axial distance between adjacent fishing lines on the bobbin trunk 7a.

The fishing line winding pitch P is not constant but depends on the structure of the oscillating mechanism 21. Thus, here, the average line winding pitch is used as the line winding pitch P. The average line winding pitch is obtained by dividing a round-trip stroke distance (S×2) by the number of rotations of the rotor 9 during one round-trip reciprocation of the spool shaft 15.

The first value (S/P) obtained by dividing the stroke distance S of the spool shaft 15 by the fishing line winding pitch P is greater than or equal to 20. The first value (S/P) obtained by dividing the stroke distance S of the spool shaft 15 by the fishing line winding pitch P is less than or equal to 30. That is, the first value (S/P) obtained by dividing the stroke distance S of the spool shaft 15 by the fishing line winding pitch P is greater than or equal to 20 and less than or equal to 30. These relationships are expressed by the relational expression "20≤(S/P)≤30."

As shown in FIG. 6, the stroke distance S of the spool shaft 15 is the amount that the spool shaft 15 is moved in the front-rear direction by the oscillating mechanism 21. The stroke distance S of the spool shaft 15 is preferably greater than or equal to 12 mm and less than or equal to 25 mm.

The second value ((S/P)×R) obtained by multiplying the first value (S/P) obtained by dividing the stroke distance S of the spool shaft 15 by the fishing line winding pitch P by the outer diameter R of the front flange 7b is greater than or equal to 950 and less than or equal to 1500. This relationship is expressed by the relational expression "950≤{(S/P)×R}≤1500."

FIG. 7 shows in tabular form each of the above-described numerical values as well as comprehensive ratings for casting and reeling a spinning reel 1 to which embodiments of the present invention have been applied (adopted models 1 and 2), a spinning reel 1 that can employ embodiments of the present invention by changing specifications of the adopted models 1 and 2 (comparative model 3), and conventional spinning reels (conventional models 1-6).

The "comprehensive ratings for casting and reeling" in FIG. 7 shows the results from a plurality of tests performed to assess casting and reeling (fishing line winding) for each of "size categories A, B, C" of each spinning reel based on sensory evaluations and rankings by a paired comparison test method with respect to quietness, stretching sensation, winding stability, and the like. In the code for the "comprehensive ratings for casting and reeling," the letters represents the size category and the numerical value represents the ranking.

For example, under size category A, the comprehensive rating A1 of adopted model 1 has the highest rating, as compared with the comprehensive ratings A2, A3 of conventional models 1 and 4, respectively. Under size category B, the comprehensive rating B1 of adopted model 2 has the highest rating, as compared with the comprehensive ratings B2, B3 of conventional models 2 and 5, respectively. Under size category C, the comprehensive rating C1 of comparative model 3 has the highest rating, as compared with the comprehensive ratings C2, C3 of conventional models 3 and 6, respectively. Thus, the comprehensive ratings A1, B1, and C1 of the adopted models 1, 2, and comparative model 3 obtained the highest ratings in each of the size categories A, B, C.

The spinning reel 1 described above has the following features. In the spinning reel 1 in which the front flange 7b has the outer diameter R of less than 60 mm, the first value (S/P) obtained by dividing the stroke distance S of the spool shaft 15 by the fishing line winding pitch P is greater than or equal to 20. By designing the oscillating mechanism 21 and the spool 7 using this configuration, the problems of the conventional spinning reels can be suitably solved.

In the spinning reel 1 in which the front flange 7b has the outer diameter R of less than 60 mm, by setting the first value (S/P) obtained by dividing the stroke distance S of the spool shaft 15 by the fishing line winding pitch P to be less than or equal to 30, the problems of the conventional spinning reels can be suitably solved.

In the spinning reel 1 in which the front flange 7b has the outer diameter R of less than 60 mm, the second value ((S/P)×R) obtained by multiplying the first value (S/P) obtained by dividing the stroke distance S of the spool shaft 15 by the fishing line winding pitch P by the outer diameter R of the front flange 7b is greater than or equal to 950 and less than or equal to 1500. As a result, by designing the oscillating mechanism 21 and the spool 7 in accordance with the outer diameter R of the front flange 7b, the problems of the conventional spinning reels can be suitably solved.

In the spinning reel 1 in which the front flange 7b has the outer diameter R of less than 60 mm, by setting the winding pitch P to be less than or equal to 1.0 mm, the problems of the conventional spinning reels can be suitably solved.

Since the spinning reel 1 in which the outer diameter R of front flange 7b is less than 60 mm has the first intermediate gear 31 and the second intermediate gear 33, it is possible to wind the fishing line around the bobbin trunk 7a as the speed of movement of the spool shaft 15 in the front-rear direction is reduced. As a result, the problems of the conventional spinning reels can be suitably solved with a relatively simple structure.

Embodiments of the present invention can be used in a spinning reel.

What is claimed is:

1. A spinning reel, comprising:
   a reel body;
   a spool shaft moveably supported to the reel body in a front-rear direction with a reciprocal stroke distance (S); and
   a spool connecting to the spool shaft, and having a bobbin trunk capable of having a fishing line wound therearound, and a front flange extending radially outward from a front end of the bobbin trunk;
   the front flange having an outer diameter which is a less than 60 mm, and
   a first value (S/P) obtained by dividing the stroke distance (S) by a winding pitch (P) of the fishing line is greater than or equal to 20.

2. The spinning reel according to claim 1, wherein the value is less than or equal to 30.

3. The spinning reel according to claim 1, wherein a second value ((S/P)×R) obtained by multiplying the first value by the outer diameter of the front flange is greater than or equal to 950 and less than or equal to 1500.

4. The spinning reel according to claim 1, wherein the winding pitch is obtained by dividing a round trip of the stroke distance (S×2) by a number of rotations of a rotor under one round trip of the spool shaft, the winding pitch being less than or equal to 1.0 mm.

5. The spinning reel according to claim 1, further comprising
   a handle rotatably supported by the reel body,
   a pinion gear rotatably supported by the reel body so as to transmit a rotation of the handle,
   a first intermediate gear configured to rotate about a first axis parallel to the spool shaft, the first intermediate gear having a first large-diameter gear configured to mesh with the pinion gear and a first small-diameter gear having a smaller diameter than the first large-diameter gear and configured to integrally rotate with the first large-diameter gear,
   a second intermediate gear configured to rotate about a second axis parallel to the first axis, the second intermediate gear having a second large-diameter gear configured to mesh with the first small-diameter gear and a second small-diameter gear having a smaller diameter than the second large-diameter gear and configured to integrally rotate with the second large-diameter gear, and
   a reciprocating mechanism configured to move the spool shaft in the front-rear direction reciprocally, the reciprocating mechanism having a driven gear configured to mesh with the second small-diameter gear and a worm shaft configured to integrally rotate with the driven gear.

* * * * *